No. 862,500. PATENTED AUG. 6, 1907.
M. MURRAY.
BRAKE MECHANISM FOR HAND PROPELLED VEHICLES.
APPLICATION FILED NOV. 7, 1906.
2 SHEETS—SHEET 1.
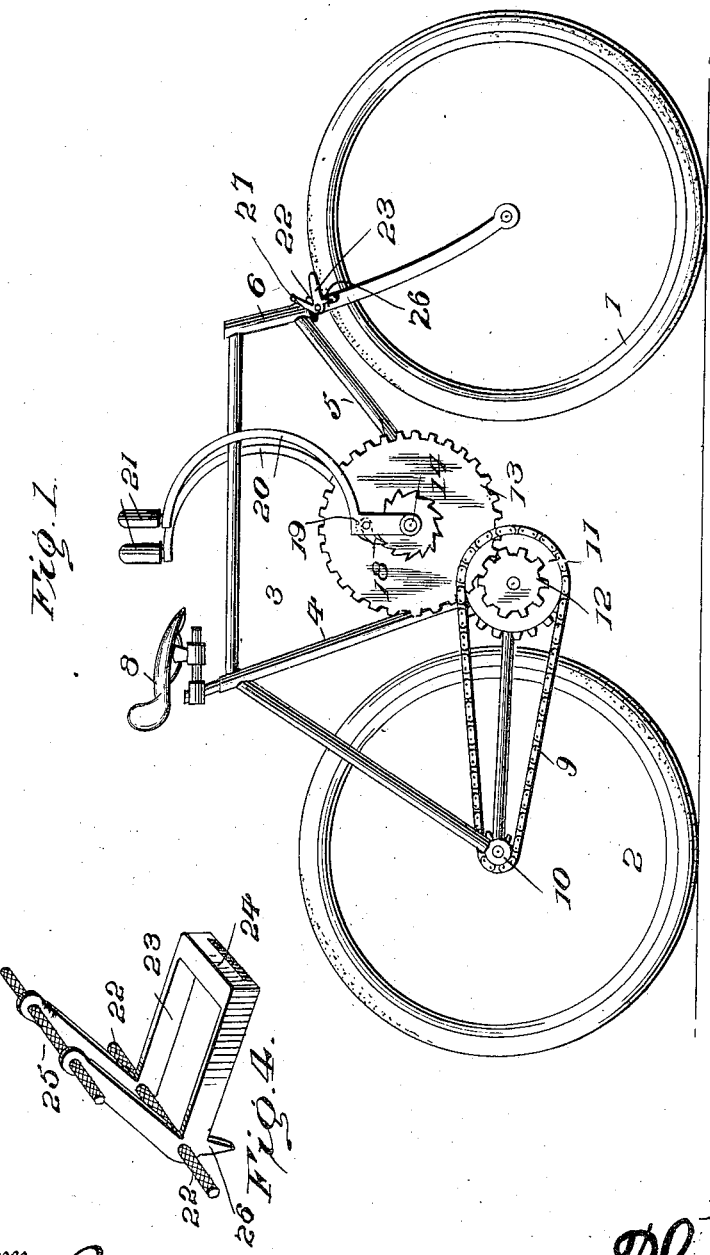
Witnesses
Inventor
M. Murray
By
Attorneys No. 862,500. PATENTED AUG. 6, 1907.
M. MURRAY.
BRAKE MECHANISM FOR HAND PROPELLED VEHICLES.
APPLICATION FILED NOV. 7, 1906.
2 SHEETS—SHEET 2.
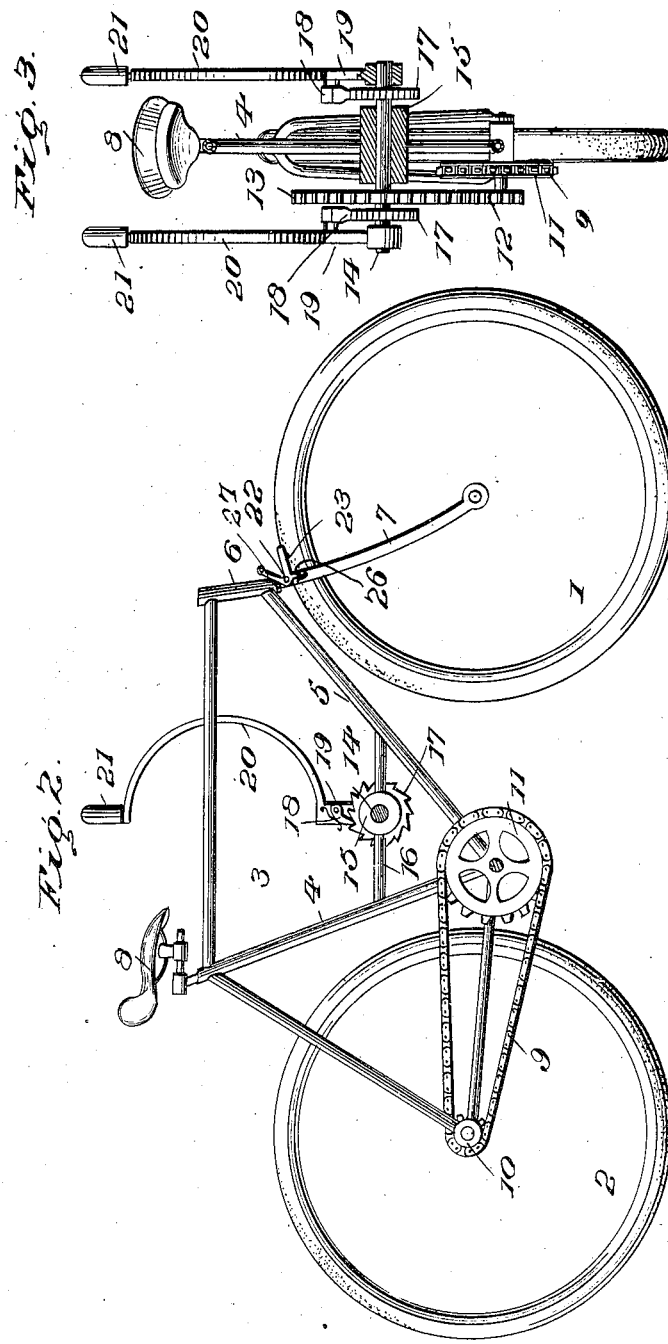
Witnesses
Inventor
M. Murray
By
Attorneys

UNITED STATES PATENT OFFICE.

MICHAEL MURRAY, OF HARRISBURG, PENNSYLVANIA.

BRAKE MECHANISM FOR HAND-PROPELLED VEHICLES.

No. 862,500.　　　　　Specification of Letters Patent.　　　　　Patented Aug. 6, 1907.

Application filed November 7, 1906. Serial No. 342,407.

*To all whom it may concern:*

Be it known that I, MICHAEL MURRAY, a citizen of the United States, residing at Harrisburg, in the county of Dauphin and State of Pennsylvania, have invented certain new and useful Improvements in Brake Mechanism for Hand-Propelled Vehicles, of which the following is a specification.

This invention contemplates certain new and useful improvements in hand-propelled vehicles and relates particularly to an improved construction of brake mechanism which will enable the rider to successfully and easily apply the brake to the front steering wheel of the vehicle with substantially the same means by which he steers the vehicle with his feet.

With this and other objects in view, the invention consists in certain constructions, arrangements and combinations of the parts hereinafter specifically described and claimed.

For a full understanding of the invention and the merits thereof and also to acquire a knowledge of the details of construction of the means for effecting the result, reference is to be had to the following description and accompanying drawings, in which:

Figure 1 is a side elevation of a bicycle embodying my invention. Fig. 2 is a substantially similar view except that the propulsion means is partly omitted or cut-away, a section being taken through the drive shaft; Fig. 3 is a tranverse sectional view taken approximately on the drive shaft; and, Fig. 4 is a detail perspective view of the steering and brake devices.

Referring to the drawings, which illustrate my invention as embodied in a bicycle, the numeral 1 designates the front or steering wheel of the bicycle, 2 the rear or driving wheel thereof, 3 the frame embodying the king-post or saddle post tube, 4 the front lower ratchet or diagonal brace 5 and the steering post head 6, and 7 designates the front fork, the upper end of which is mounted to turn in the steering head 6 in the usual manner.

8 designates a seat or saddle which is preferably constructed with a cantle of more than the usual height, so that the rider may firmly brace himself when pulling rearwardly with his arm and pushing forwardly with his feet, as will be hereinafter fully set forth.

The rear wheel 2 is operatively connected by means of the sprocket chain or similar drive 9 and the sprocket wheel 10 on its axle, with a larger sprocket wheel 11. The shaft of the sprocket wheel 11 also carries a spur gear 12 which meshes with the preferably larger spur gear 13 located in a higher plane and mounted to turn with the shaft 14 journaled in the bearing 15. The bearing 15 is hung from a longitudinal rod 16 braced or secured in any manner at its rear end to the saddle post tube 4 and at its front end to the lower diagonal brace 5 and extending in a horizontal plane as shown. Also mounted to turn with the shaft 14, are two ratchet wheels 17, one near the end of the shaft, and said ratchet wheels are designed to be actuated by means of pawls 18 that are carried by actuating levers 19 loosely mounted at their lower ends on the extremity of the shaft 14 and extending therefrom. The two levers 19 are preferably bowed forwardly intermediate of their length so as to provide a suitable clearance for the rider's knees and their upper ends are provided with any suitable construction and design of handles 21. The said levers 19 are preferably designed to work alternately, that is, they exert their force upon the shaft 14 one after the other, one lever moving forwardly while the other is being moved rearwardly.

Extending laterally in opposite directions from the upper end of the front fork 7 and in the usual place where the coasting rest or supports are usually located on bicycles, are two foot rests 22, preferably of rod-like formation, upon which the rider rests his two feet so as to turn the fork and thereby steer the vehicle. Not only do these rods 22 constitute foot rests for steering, but it is evident that they constitute a brace for the rider's feet, so that he may sit firmly upon the saddle 8 up against the high cantle thereof, and by then pulling the two handles rearwardly in alternation and pressing forwardly with his feet, it is evident that a large number of muscles may be brought into play to propel the vehicle, the muscles of the arms being supplemented by those of the back and also by the thigh muscles.

In order to bring the vehicle quickly to a standstill, I provide brake mechanism 23 which, in the present instance, is in the form of two bell crank levers designed to embrace the rim of the wheel and journaled at their elbows on the rods 22 and connected at one end by a cross bar 24 which constitutes the brake-shoe and is adapted to be swung into a frictional engagement with the wheel rim or tire. The opposite ends of the two bell crank levers are preferably connected together by a cross bar 25, and the arms which carry the cross bar extend upwardly above the foot rests 22, as shown.

In the preferred operation of the device, the rider places the hollow of his foot on the foot rests or steering rods 22, and it is evident that he may then readily press the ball of either foot or both feet against the cross bar 25 by rocking his feet on the ankle as a pivot, so as to rock the frame 25 in a direction to carry the brake shoe 24 against the wheel rim. To return the braking frame 23 to its normal inoperative position and to maintain it in such position, one or both arms may be provided with a lug or extension 26 joined to one branch of the fork 7 by means of the spring 27, as shown.

Having thus described the invention, what is claimed as new is:

1. In a hand propelled vehicle embodying a front steering wheel and a fork in which said wheel is mounted, the combination of foot rests projecting from the fork, bell crank levers fulcrumed at the elbow on said foot rests, one pair of arms of said levers extending above the said foot rests, and a cross bar connecting the ends of the other arms of said levers and extending across the rim of the steering wheel, as and for the purpose set forth.

2. In a hand propelled vehicle embodying a front steering wheel and a fork in which said wheel is mounted, the combination of foot rests projecting from the fork, two bell crank levers fulcrumed at the elbow on said foot rest one pair of arms of said levers extending above the foot rest, a cross bar connecting said arms, and another cross bar connected to the other ends of said levers and extending across the rim of the wheel whereby to constitute a brake-shoe.

In testimony whereof I affix my signature in presence of two witnesses.

MICHAEL MURRAY. [L. S.]

Witnesses:
EUGENE SNYDER,
WILLIAM A. BAILETS.